United States Patent [19]

Rütsche et al.

[11] Patent Number: 4,936,066
[45] Date of Patent: Jun. 26, 1990

[54] CONNECTING ELEMENT, ESPECIALLY FOR CONNECTING THE SIDE WALLS OF A SUPPLY BODY WITH COLUMNS OF A ROOM DIVIDER

[75] Inventors: Wendolin Rütsche, Rüti; Rudolf Menzi, Wagen, both of Switzerland

[73] Assignee: Embru-Werke, Mantel & Cie., Ruti, Switzerland

[21] Appl. No.: 303,161

[22] Filed: Jan. 27, 1989

[30] Foreign Application Priority Data

Jan. 28, 1988 [CH] Switzerland .................. 292/88

[51] Int. Cl.⁵ .................. E04G 21/04; A44B 17/00
[52] U.S. Cl. .................. 52/238.1; 52/127.7; 52/239; 52/DIG. 1; 24/289; 24/614; 403/406.1; 411/508
[58] Field of Search .................. 52/238.1, 239, 127.7, 52/241, 483, 489, 582, 584, 768, 511, 512, 127.2, DIG. 1; 411/348, 349, 508-510, 549, 553-555; 403/406.1, 405.1, 408.1; 24/297, 614, 289

[56] References Cited

U.S. PATENT DOCUMENTS

| | | | |
|---|---|---|---|
| 3,179,367 | 4/1965 | Rapata | 411/553 |
| 4,422,222 | 12/1983 | Notoya | 411/508 X |
| 4,571,902 | 2/1986 | Liebetrau | 52/127.2 |
| 4,762,437 | 8/1988 | Mitomi | 403/406.1 |

FOREIGN PATENT DOCUMENTS 621208 7/1961 Italy .................. 52/127.7

Primary Examiner—Richard E. Chilcot, Jr.
Attorney, Agent, or Firm—Kinzer, Plyer, Dorn, McEachran & Jambor

[57] ABSTRACT

The connecting element (1) has a flat head (2) with an inside hexagon (3), a shaft (7, 8) and two studs (5, 6). The two studs (5, 6) are offset against one another through 90°. The first stud (5) molded on the free shaft end is shorter than the second stud (6). The connecting element (1) is suited especially for connecting the side wall (37) of a supply body of a room divider with vertical, tubular columns (35) of the room divider. The connecting element is very rapidly mounted. In the installed state the second stud (6) holds the side wall (37) spaced from the column (35). For this reason the supply body is somewhat shorter than the clear distance between adjacent columns (35). The supply bodies, therefore, can be installed in and removed from the room divider very simply and rapidly subsequently.

11 Claims, 3 Drawing Sheets

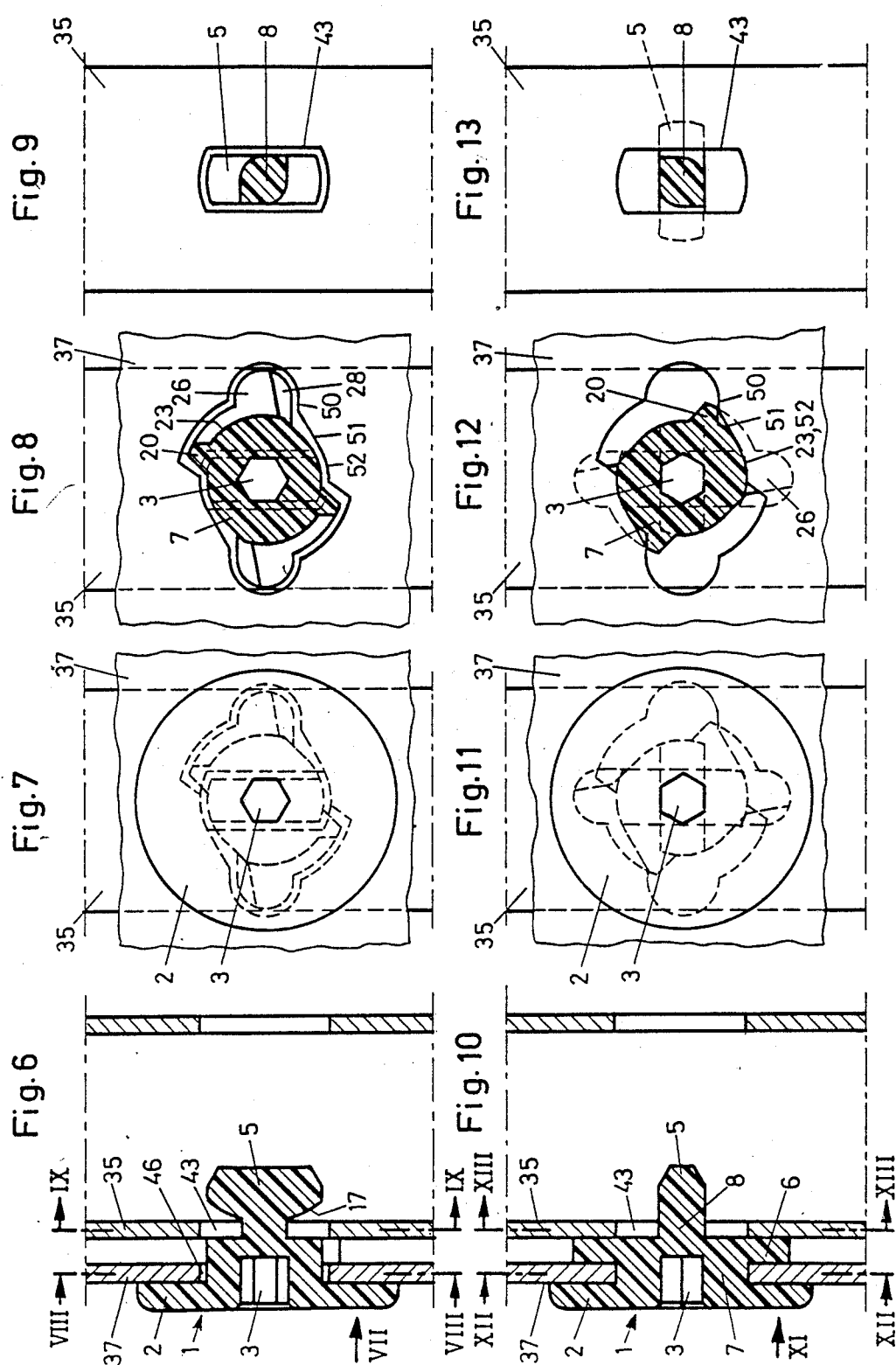

CONNECTING ELEMENT, ESPECIALLY FOR CONNECTING THE SIDE WALLS OF A SUPPLY BODY WITH COLUMNS OF A ROOM DIVIDER

BACKGROUND AND SUMMARY OF THE INVENTION

A bayonet-type connecting element is generally well known. It is a matter of a bayonet connector the stud of which is inserted through aligned oblong holes into two components, whereupon the connector is turned on its head by means of a wrench through 90°. The two components are then clamped between head and stud.

Underlying the present invention is the problem of further developing a connecting element of the type mentioned at the outset in such a way that the two components to be connected are simultaneously held spaced from one another by the connecting element. This problem is solved under the present invention.

The connecting element according to the invention is suited especially for connecting the side walls of supply bodies with the columns of a room divider. In this use, because of the construction according to the invention of the connecting element, the width of the supply body can be kept somewhat smaller than the clear distance between adjacent columns. Thereby it is possible to remove and to install the supply bodies of the room divider individually, without its being necessary for the entire room divider to be disassembled. The room divider, therefore, can be adapted rapidly and simply to changing requirements.

BRIEF DESCRIPTION OF THE DRAWING

In the following an example of execution of the invention is explained with the aid of the drawing. Therein:

FIG. 6 shows a vertical section through a connection, containing the connecting element according to FIGS. 1-5, before its turning;

FIG. 7 the view VII in FIG. 6;

FIGS. 8 and 9 show sections along the lines VIII-VIII and IX-IX, respectively, in FIG. 6;

FIGS. 10 to 13 show the representations corresponding to FIGS. 6 to 9 after the turning of the connecting element;

DESCRIPTION OF THE PREFERRED EMBODIMENT

Figure 1:
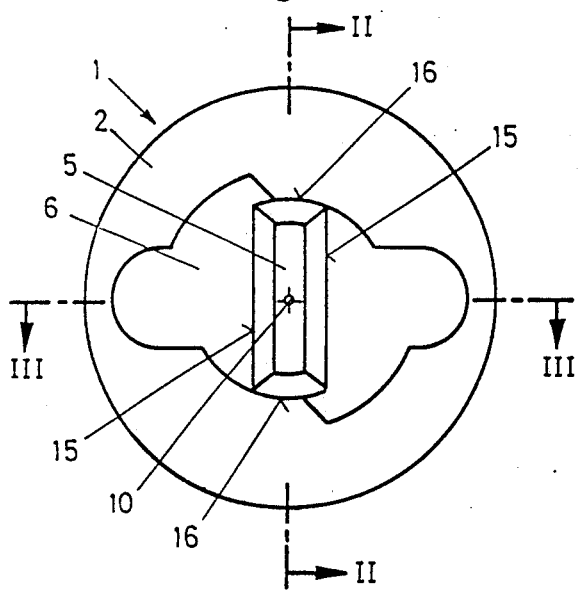
FIG. 1 shows a face view of a connecting element according to the invention.
Figure 2:
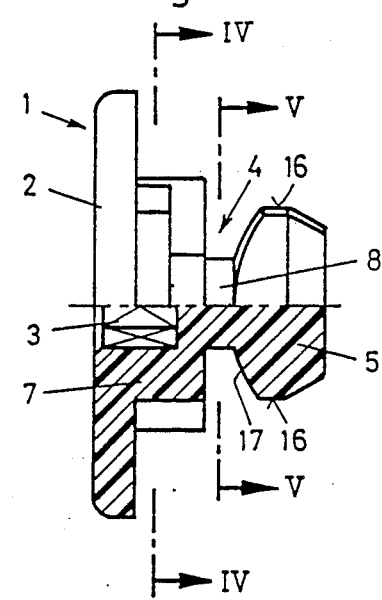
FIGS. 2 and 3 show sections along the lines II—II and III—III, respectively, in FIG. 1.
Figure 3:
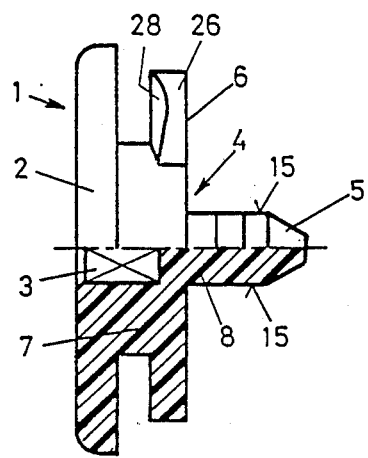
Figure 4:
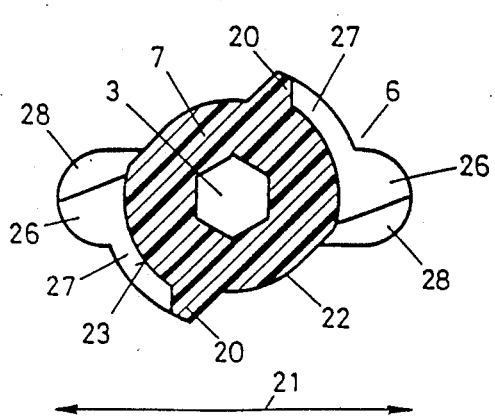
FIGS. 4 and 5 show sections along the lines IV and V—V, respectively, in FIG. 4
Figure 5:
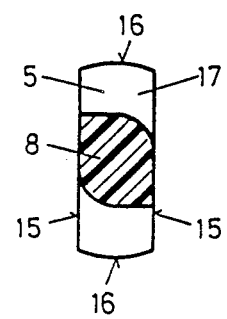

The connecting element according to FIGS. 1 to 5 is made in one piece from a thermoplastic material, preferably fiber-reinforced plastic and constructed axially symmetrical to the longitudinal axis 10. It has a disk-form, round head 2 with an inner hexagon 3, a shaft 4 and a first stud 5. With spacing from and between the stud 5 and the head 2 there is present a second stud 6, which subdivides the shaft 4 into a head-side first shaft section 7 and a shaft section 8 lying between the studs 5, 6. The stud 5 has two parallel side surfaces 15 and two cylindrical surfaces 16. Facing the head 2 it has a spherical engagement surface 17. Toward the free end the bolt 5 is tapered in wedge form in axial direction on both sides. The cross section of the shaft section 8 is approximately rectangular, two oppositely lying edges being cylindrically rounded. The shaft section 7 has two radially protruding lugs 20 lying diametrically opposite. These are offset by about 70° with respect to the direction 21 of greatest width of the second stud 6. In circumferential direction on the longer side in the direction toward the stud 6 the shaft section 7 has a cylindrical circumferential surface 22, the radius of which corresponds about to the radius of the surfaces 16 of the bolt 5. The cylindrical circumferential surfaces 23 following upon the lugs 20 on the other side have a larger radius and extend to beyond the direction 21. The direction 21 of greatest width of the stud 6 is offset by 90° with respect to the longitudinal extent of the stud 5. The bolt 6 has on this greatest width, which is less than the diameter of the head 2, semicircular tabs 26. On the side of the circumferential surface 23 these tabs 26 go over into an arcuate flange 27 of the radius of the lugs 20, which follows upon the lug concerned. On the side of the circumferential surface 22, however, the tabs 26 go over into this circumferential surface 22. On the side facing the head 2 the tabs 26 have wedge surfaces 28.

Figure 14:
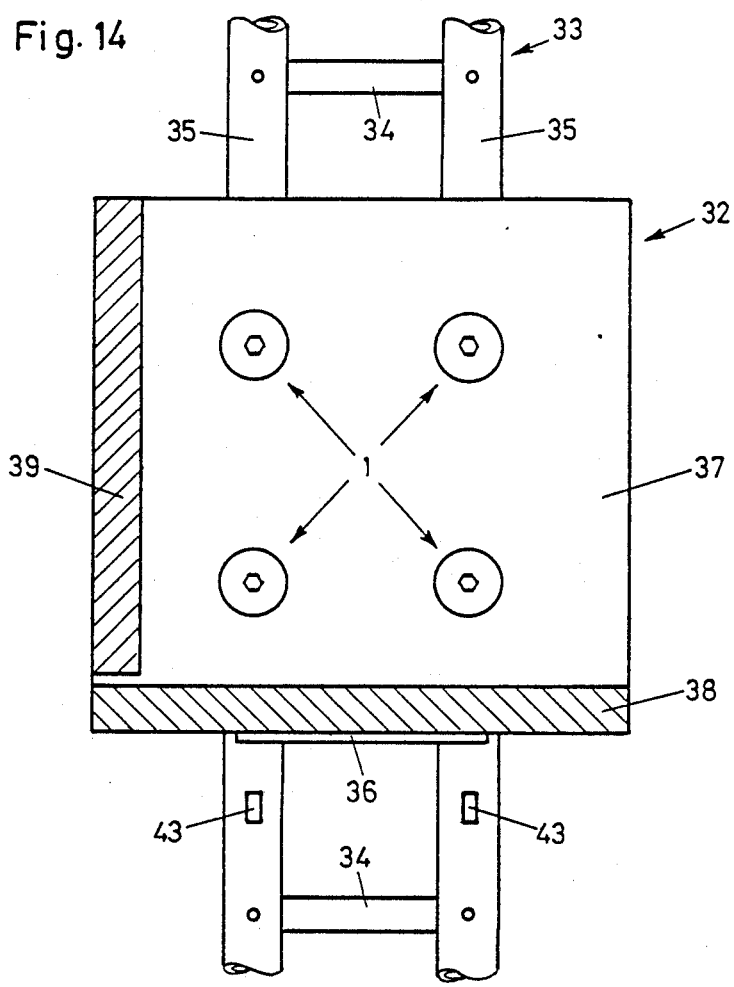
FIG. 14 shows a vertical section through a supply body.
Figure 15:
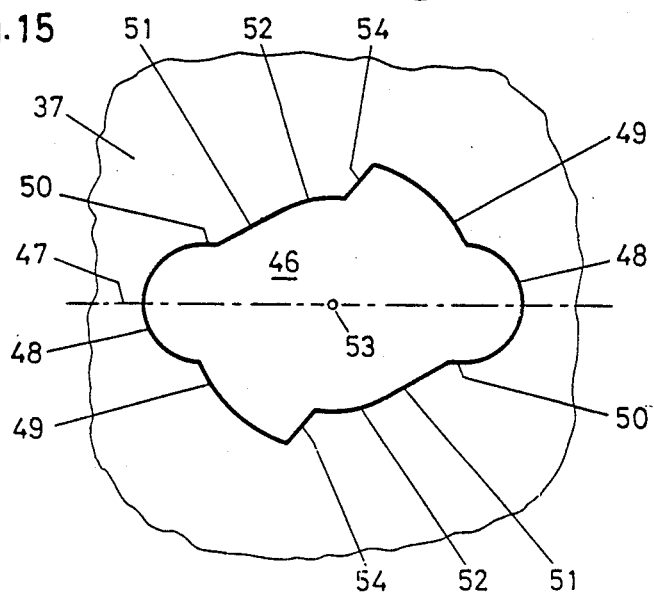
FIG. 15 shows an opening in the side wall of the supply body.

In FIG. 14 there is represented a preferred use of the connecting element 1, namely the fastening of a supply body 32 to columns 33 of a room divider. The supply body 32 is meant for the reception of office utensils. The column 33 consists of two vertical pipes 35 joined with one another by means of horizontal connecting rods 34. On one of the connecting rods 34 there is suspended an L-shaped rack board carrier 36, which carries the supply body 32. The supply body has two side walls 37 of sheet metal, which are screwed fast on their lower edge to a face side of base plate 38. On the rear side a back wall 39 is fastened to the side walls 37. In front, the supply body 32 is closable by a shutter, or it is possible for guide rails for a drawer to be fastened to the side walls 37. The connecting elements 1 serve for the rapid connecting of the side walls 37 with the pipes 35. For this the pipes 35 have rectangular, vertical passage holes 43 for the passage of the first stud 5. The side walls 37 have four centrally symmetrical openings 46 (represented in detail in FIG. 15) for the passage of the second stud 6. Corresponding to the tabs 26 the opening 46 in the zone of the greatest width on a horizontal axis 47 has two semicircular segments 48. Following upon the segments 48 there follows in the contour of the opening 46 on the one side a circular segment 49 for the passage of the flanges 27. On the other side of the segments 48 the contour is more strongly constricted. A short section 50 running about parallel to the axis 47 connecting tangentially to the segment 48, goes over into a further straight section 51 which goes over tangentially into a circular segment 52. The circular segment 52 is concentric to the center 53 of the opening 46 and its radius corresponds to the radius of the circumferential surface 23 of the first shaft section 7 of the connecting element 1. The segment 52 cuts the perpendicular to the axis 47 through the center 53. A short, rectilinear transition piece 54 connects the segment 52 with the segment 49. The transition piece 54 is inclined with respect to the radial direction and serves as stop for the lug 20 in the unclamped position of the connecting element 1. In the clamped position rotated through 90° the lug 20 engages on the section 50.

In FIGS. 6 to 9 the connecting element is shown after the insertion into the opening 46 of the side wall 37 and the hole 43 of the pipe 35. In the turning of the connecting element 1 by means of a suitable wrench the wedge surfaces 28 come up behind the sections 50, 51 of the opening circumference, so that the wall 37 is firmly clamped between head 2 and stud 6. Simultaneously the spherical engagement surface 17 of the stud 5 runs up on the inner wall of the pipe 35, so that the pipe 35 is clamped between the studs 5, 6. FIGS. 10 to 13 show the clamped position of the connecting element 1, in which the lugs 20 engage on the section 50. The circumferential surfaces 23 of the shaft section 7 are centered there in the circular segments 52 of the opening 46 (FIG. 12).

We claim:

1. A fastener for connecting a first component with a second component, the fastener comprising:
   a torsionally rigid stem (4);
   a head (2) formed on a first end of said stem and having wrench engagement surfaces (3) for turning the fastener;
   a first rigid stud (5) formed on a second end of said stem (4);
   a second rigid stud (6) formed on said stem (4) spaced both from said head (2) and from said first stud (5) in axial direction of said stem (4), said second stud (6) dividing said stem (4) into a first stem section (7) between said second stud (6) and said head (2) and a second stem section (8) between said second and first studs;
   wherein the longitudinal extension of the first stud is angularly offset with respect to and is shorter than the longitudinal extension of said second stud, and wherein said second stem section (8) has a smaller cross sectional area than said first stem section (7).

2. A fastener according to claim 1 wherein said head (2) is disc-shaped and round and its diameter is greater than the longitudinal extension of said second stud (6).

3. A fastener according to claim 1 wherein said second stud (6) has plane surfaces perpendicular to the axial extension of said stem (4) facing said head (2) and said first stud (5).

4. A fastener according to claim 1 wherein the longitudinal extension of said first stud (5) is offset by 90° with respect to the longitudinal extension of said second stud (6).

5. A fastener according to claim 1 wherein said first stem section (7) has two diametrically oppositely arranged lugs (20) which are angularly offset with respect to the longitudinal extension of said second stud (6).

6. A fastener according to claim 5 wherein the first stud (5) has a diameter (16, 16), wherein the first stem section (7) is cylindrical and presents, following on one side each upon the two lugs (20), circular segment sections (23) the diameter of which is greater than that (16, 16) of the first stud (5), and wherein second circumferential surface sections (22) following on the other side upon the lugs (20) are reduced in diameter with respect to said segment sections (23).

7. A fastener according to claim 1 wherein said second stud (6) has two wedge surfaces (28) lying diametrically opposite and facing said head (2).

8. A fastener according to claim 1 wherein the surface (17) of the first stud (5) facing the second stud (6) is substantially spherical.

9. A fastener according to claim 1 wherein said first stud (5) is tapered in axial direction both in width and in length in wedge form.

10. Connecting elements connecting spaced side walls (37) of a supply body (32) with columns (33) of a room divider, said supply body having a base plate (38) to which the side walls are connected and also having a back wall (39), said connecting elements each comprising: a head (2) for engagement on one side of each of the side walls (37), said head (2) presenting wrench engagement surfaces (3), a shaft (4) molded on the head (2) for insertion through an opening (43, 46) each in the side walls (37) and the columns (33) as well as a first stud (5) formed on the free shaft end for gripping behind the second component (35), characterized in that between the head (2) and the first stud (5) a second stud (6) is formed on the shaft (4) which is angularly offset with respect to the first stud (5) and is spaced both from the head (2) and from the first stud (5).

11. A supply body (32) for a room divider comprising two side walls (37) which are fastened to a base plate (38) and a back wall (39), the side walls (37) each having at least one opening (46) with the following contour centrally symmetrical with respect to the opening center (53);
   (a) the axis of the greatest width (47) extends horizontally parallel to the base plate (38) and terminates at each end in an arcuate segment (48) split by said axis;
   (b) the contour proceeding from one segment (48) radially outward in an arcuate section (49) leading toward the other arcuate segment (48) and terminating in a straight, inwardly directed segment (54) with said section (49) and said straight segment (54) being diagonally opposed on opposite sides of said axis.

* * * * *